July 29, 1947. J. DE SWART 2,424,602

FLUSH RIVET

Filed May 15, 1945

Inventor
Jan de Swart
By Lyon & Lyon
Attorneys

Patented July 29, 1947

2,424,602

UNITED STATES PATENT OFFICE 2,424,602

FLUSH RIVET

Jan de Swart, Los Angeles, Calif., assignor, by mesne assignments, to Shellmar Products Corporation, Mount Vernon, Ohio, a corporation of Delaware Application May 15, 1945, Serial No. 593,861

3 Claims. (Cl. 85—40)

My invention relates to flush rivets, more particularly to flush rivets adapted to be made from plastic materials.

Among the objects of my invention are:

First, to provide a flush rivet which does not require a preformed counterbore, but is so arranged that the head of the rivet wedges into the rivet opening.

Second, to provide a flush rivet which may be installed from one side of a member; that is, it may be employed as a "blind" rivet. Furthermore, it may fit openings extending through the member or members to be fastened, or be secured in sockets or blind holes.

Third, to provide a flush rivet wherein a dual wedging action is attained, first by the forcing of the rivet head into the rivet opening, and secondly by forcing a wedging pin into the rivet head.

With the above and other objects in view, reference is directed to the accompanying drawings, in which.

Figure 1:
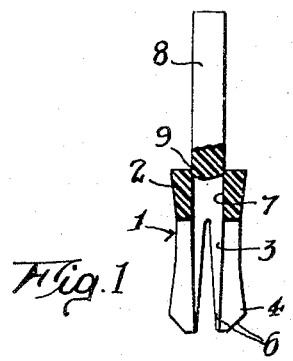
Figure 1 is a longitudinal sectional view of one form of my rivet before it has been used.

My flush rivet comprises a body 1 having a slightly tapering head 2. The taper of the head should be such that it will wedge into a cylindrical hole. A shank 3 extends from the head 2. The portion of the shank adjacent to the head may be cylindrical, or taper slightly in the opposite direction from the head. The extended portion 4 of the shank flares or tapers outwardly in an opposite direction to the head 2 to form a second head for the rivet. The extremity of the shank 3 may be beveled or rounded so that it may be readily guided into a cylindrical opening.

The shank 3 is provided with axial slots 6, preferably two pair of such slots disposed in right-angular relation and tapering from the extremity of the shank to the head 2.

Figure 4:
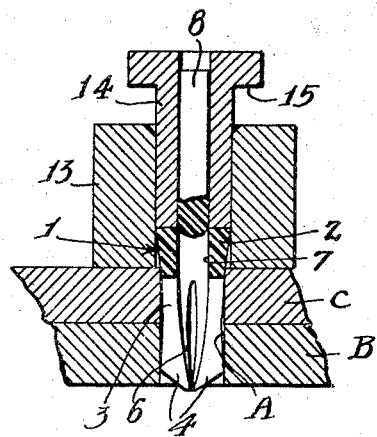
Figure 4 is a longitudinal sectional view of the rivet shown in Figure 1, positioned in an opening in material to be riveted and showing a tool suitable for riveting the rivet.
Figure 5:
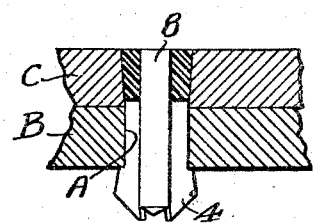
Figure 5 is a longitudinal sectional view of the rivet after being secured in position.

A bore 7 extends through the head 2 and shank 3. The bore 7 is normally constant in diameter, but becomes tapered toward its lower end when the shank 3 is fitted into aligning holes A in members B and C to be riveted, as shown in Fig. 4.

A pin 8 extends from the head 2. In the construction shown in Fig. 1, both the body 1 and the pin 8 are molded of plastic material and cast in a single piece, the pin 8 forming an integral connection 9 with the upper end of the head 2. This connection is adapted to be severed when the pin 8 is driven into the bore 7.

Figure 2:
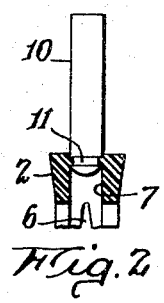
Figure 2 is a fragmentary longitudinal sectional view of a modified form thereof.

In place of the single-piece construction shown in Figure 1, and the integral connection 9, a pin 10 having an insert end 11 may be molded or cast in the head 2 as shown in Figure 2. The insert portion of the pin may be grooved or otherwise formed to provide an interlocking connection sufficient to hold the pin in its proper relation to the body 1 to withstand handling and transportation.

Figure 3:
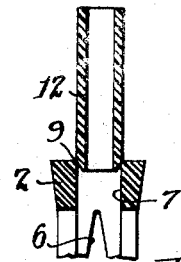
Figure 3 is another fragmentary longitudinal sectional view of a further modified form thereof.

The pin 8 or 10 need not be solid as shown in Figures 1 and 2, but may take the form of a tubular pin 12 as shown in Figure 3. The tubular pin 12 is shown as an integrally molded pin corresponding to pin 8, but may be separate and cast in place as shown in Figure 2.

The flush rivet is employed as follows: A cylindrical hole A is drilled in the members to be connected. The hole preferably has a diameter approximately equal to the smaller end of the tapered head 2. By reason of the axial slots 6 the rivet may be readily inserted until the tapered portion of the head begins to bear against the upper rim of the hole A as shown in Figure 4.

For purposes of riveting, a special tool shown in Figure 4 is preferred. This tool comprises a guide ring 13 adapted to fit around the head 2, and a tubular plunger 14 adapted to receive the pins 8, 10, or 12, as the case may be. The length of the tubular plunger 14 is in excess of the pin. The tubular plunger is preferably provided with a shoulder 15 so located that it engages the guide ring 13 when the lower end of the plunger is flush with the surface of the member in which the rivet is to be secured.

By means of this simple tool the rivet head is forced into the cylindrical hole A and deforms to accommodate itself to the cylindrical hole, or expands the hole slightly depending upon the nature of material comprising the members to be riveted. After the rivet is driven flush with the upper member being riveted, the pin 8, 10, or 12, as the case may be, is driven into the bore 7. This expands the extended portion or second head 4 of the shank into tight engagement with the bore A. A double wedging action is obtained by this means. First, the pin is wedged into place by reason of the tapering head 2. In so doing, the bore 7 within the tapered head, is constricted slightly so that when the pin 8 is driven therein, a further wedging action is obtained. As the pin is driven further into the shank 3, it functions to wedge or expand the shank outwardly to tighten the connection between the rivet and the walls of the bore A.

While the rivet is shown as extending through the member it secures, it may be employed in a socket as the wedging action obtained provides ample force to effect a tight connection. Furthermore, the rivet may be employed as a "blind" rivet as access need be had to only one side of the work.

Many other embodiments of the invention may be resorted to without departing from the spirit of the invention.

I claim:

1. A flush rivet comprising: a tubular tapered head; a tubular split shank extending therefrom; a hollow pin initially protruding from the side of said head opposite from said shank and integrally joined thereto by a severable connecting portion; said head and shank adapted to be wedged into a cylindrical opening while said pin remains in its protruding position, said pin adapted thereafter to be driven by an axial force to sever said connecting portion and force said pin into said head and shank to further wedge said head and shank into said opening.

2. A flush rivet comprising: a body structure of molded deformable plastic material having a bore therethrough and comprising oppositely tapered tubular head and shank, the shank being split axially; and a hollow pin initially positioned with its tip end partially within the head and molded integrally therewith; said body structure adapted to be wedged into an opening with said pin in its initial integral position, and said pin thereafter adapted to be driven by an axial force to sever said integral connection and to force said pin into said head and shank to further wedge the same into said opening.

3. A rivet initially molded of deformable plastic material in a single piece, comprising: a tubular body portion having oppositely tapering head and shank, the shank being split; and a pin closing the head end of said body portion and protruding therefrom, there being a serverable connection between said pin and head; said head and shank adapted to be wedged into a cylindrical opening with the outer end of said head flush therewith, while said pin remains intact; said pin adapted thereafter to be severed by an axial force from its initial connection with said head and to be driven into said body portion to further wedge said head and shank in said opening and to deform the split end of said shank to provide a securing head on said rivet.

JAN DE SWART.

REFERENCES CITED

The following references are of record in the file of this patent:

UNITED STATES PATENTS

| Number | Name | Date |
|---|---|---|
| 2,246,888 | Messenger | June 21, 1941 |
| 1,000,715 | Caywood | Aug. 15, 1911 |
| 2,402,287 | Kearns | June 18, 1946 |
| 1,813,892 | Jones | July 7, 1931 |
| 917,907 | Taylor | Apr. 13, 1909 |

FOREIGN PATENTS

| Number | Country | Date |
|---|---|---|
| 5,054 | Great Britain | Apr. 23, 1885 |